United States Patent
Ishii et al.

(10) Patent No.: US 7,104,249 B2
(45) Date of Patent: Sep. 12, 2006

(54) DIRECT FUEL INJECTION/SPARK IGNITION ENGINE CONTROL DEVICE

(75) Inventors: Hitoshi Ishii, Yokosuka (JP); Masayuki Tomita, Fujisawa (JP); Toshiya Kono, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 6 days.

(21) Appl. No.: 11/038,643

(22) Filed: Jan. 21, 2005

(65) Prior Publication Data

US 2005/0161021 A1 Jul. 28, 2005

(30) Foreign Application Priority Data

Jan. 28, 2004 (JP) ............................. 2004-020085
Jul. 5, 2004 (JP) ............................. 2004-197533

(51) Int. Cl.
*F02B 5/00* (2006.01)

(52) U.S. Cl. ...................................... 123/305; 123/445

(58) Field of Classification Search ................ 123/294, 123/305, 445, 480, 472, 295, 299; 60/285
See application file for complete search history.

(56) References Cited

U.S. PATENT DOCUMENTS

| | | | |
|---|---|---|---|
| 5,865,153 A | | 2/1999 | Matsumoto |
| 6,112,716 A | | 9/2000 | Tachibana |
| 6,330,796 B1 | * | 12/2001 | Nishimura et al. ......... 123/295 |
| 6,345,499 B1 | * | 2/2002 | Nishimura et al. ......... 123/295 |
| 6,502,541 B1 | * | 1/2003 | Abo et al. .................. 123/295 |
| 6,691,671 B1 | * | 2/2004 | Duffy et al. ................ 123/299 |
| 6,751,948 B1 | * | 6/2004 | Takemura et al. ............ 60/285 |
| 6,814,049 B1 | * | 11/2004 | Vogel et al. ................ 123/305 |

FOREIGN PATENT DOCUMENTS

| | | |
|---|---|---|
| EP | 1178197 A | 2/2002 |
| GB | 1201932 A | 8/1970 |
| JP | 2000-45843 A | 2/2000 |
| JP | 2000-045844 A | 2/2000 |
| JP | 2001-336467 A | 12/2001 |
| JP | 2004-036461 A | 2/2004 |
| WO | WO-01/25618 A | 4/2001 |

* cited by examiner

*Primary Examiner*—T. M. Argenbright
(74) *Attorney, Agent, or Firm*—Shinjyu Global Ip Counselors, LLP

(57) ABSTRACT

A control apparatus is configured to achieve considerably delayed ignition timing and combustion stability, and to bring about an increase in exhaust gas temperature and a reduction in HC discharge when the engine is cold. Normal stratified combustion operation and homogeneous combustion operation are carried out when warming has been completed and the coolant temperature of the internal combustion engine has exceeded 80° C. In an injection operation at the top dead center, the injection start timing ITS occurs prior to compression top dead center (TDC) and the injection end timing ITE occurs after compression top dead center (TDC), whereby fuel injection is carried out so as to straddle the compression top dead center. The ignition timing ADV occurs after compression top dead center (TDC) and ignition occurs with a timing that is delayed from the injection start timing ITS.

18 Claims, 14 Drawing Sheets

DIRECT FUEL INJECTION/SPARK IGNITION ENGINE CONTROL DEVICE

CROSS-REFERENCE TO RELATED APPLICATIONS

This application claims priority to Japanese Patent Application Nos. 2004-020085 and 2004-197533. The entire disclosures of Japanese Patent Application Nos. 2004-020085 and 2004-197533 are hereby incorporated herein by reference.

BACKGROUND OF THE INVENTION

1. Field of the Invention

This present invention relates to a control apparatus for a direct-injection spark-ignition internal combustion engine for directly injecting fuel into the cylinder, and more specifically relates to control of the injection timing and ignition timing.

2. Background Information

Japanese Laid-Open Patent Application No. 2000-45843 discloses a technique for dividing an entire fuel injection amount into an early injection and a later injection. The early injection occurs during the intake stroke and the later injection occurs during the compression stroke, with the ignition timing being delay beyond the point of MBT when the catalytic converter for cleaning the exhaust is at a lower temperature than the activation temperature.

In view of the above, it will be apparent to those skilled in the art from this disclosure that there exists a need for an improved apparatus for a direct-injection spark-ignition internal combustion engine. This invention addresses this need in the art as well as other needs, which will become apparent to those skilled in the art from this disclosure.

SUMMARY OF THE INVENTION

It has been discovered that it is preferably to considerably delay the ignition timing to the greatest extent possible in order to reduce HC and increase the temperature of the exhaust gas for ensuring early activation of the catalyst when the internal combustion engine is cold. However, since combustion stability worsens when the ignition timing is considerably delayed, the ignition timing cannot be delayed beyond a certain limit, which is determined based on considerations related to combustion stability. In the above-described prior art, it is difficult to ensure stable combustion under conditions such as when the engine is cold in particular, the delay limit of the ignition timing that is determined based on combustion stability is relatively advanced, and adequate delay of the ignition timing cannot be achieved.

In view of these facts, one object of the present invention is to improve the combustion stability in an ATDC ignition in order to reduce HC during cold starting and the other times and/or to activate the catalyst at an early stage.

In order to achieve the above mentioned object and other objects of the present invention, a direct fuel injection/spark ignition engine control device is provided that basically comprises a fuel injection control section and an ignition timing control section.

The fuel injection control section is configured to control fuel injections of a fuel injection valve that directly injects fuel into a combustion chamber. The fuel injection control section is further configured to set a fuel injection timing including a fuel injection with an injection start timing before compression top dead center and an injection end timing after the compression top dead center so that the fuel injection is injected during a period that straddles over the compression top dead center. The ignition timing control section is configured to control sparking of a spark plug disposed in the combustion chamber such that an ignition timing is set to ignite fuel at or after the compression top dead center.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
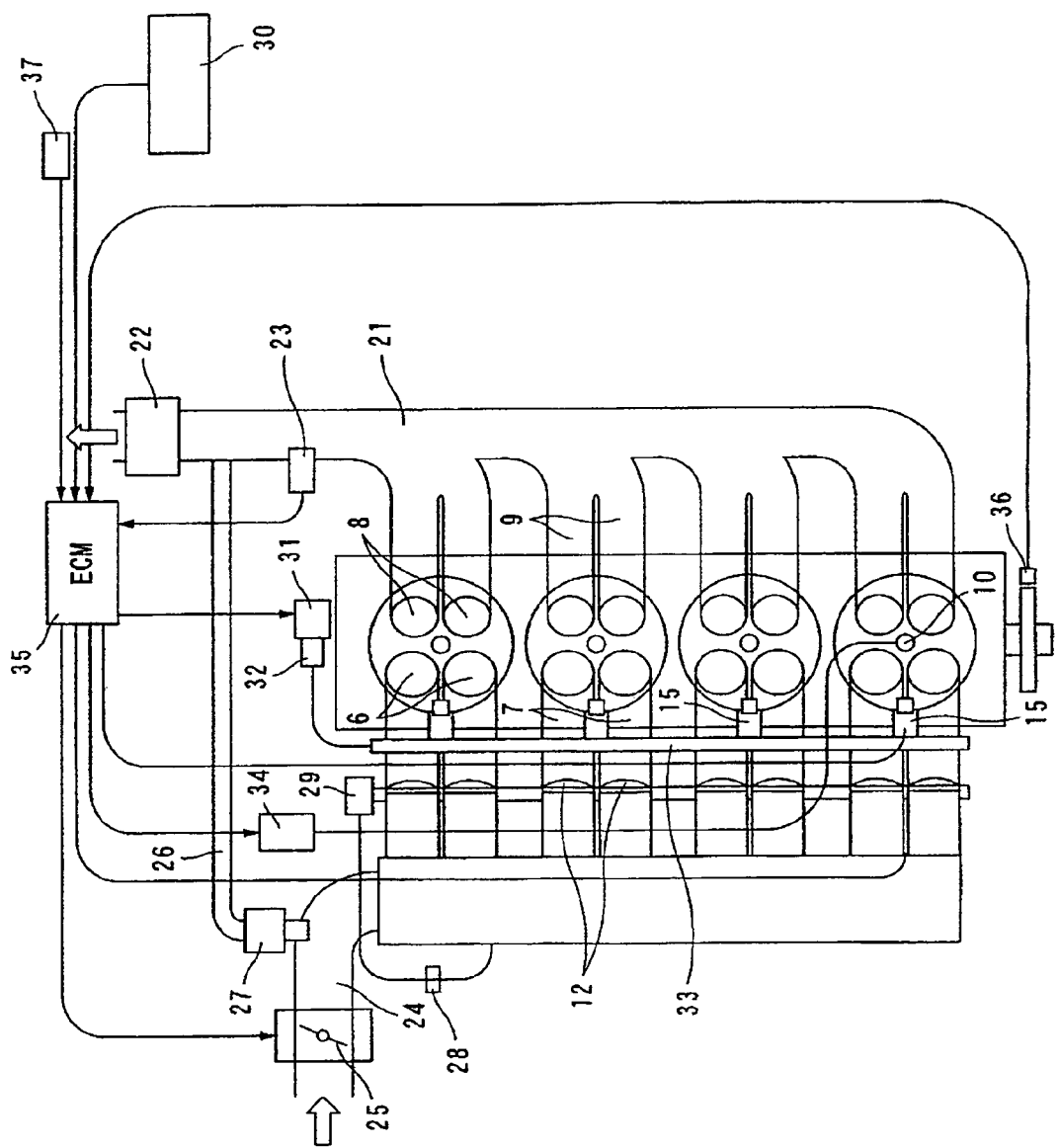
FIG. 1 is a diagrammatic view of an internal combustion engine equipped with a direct fuel injection/spark ignition engine control device in accordance with the present invention.
Figure 2:
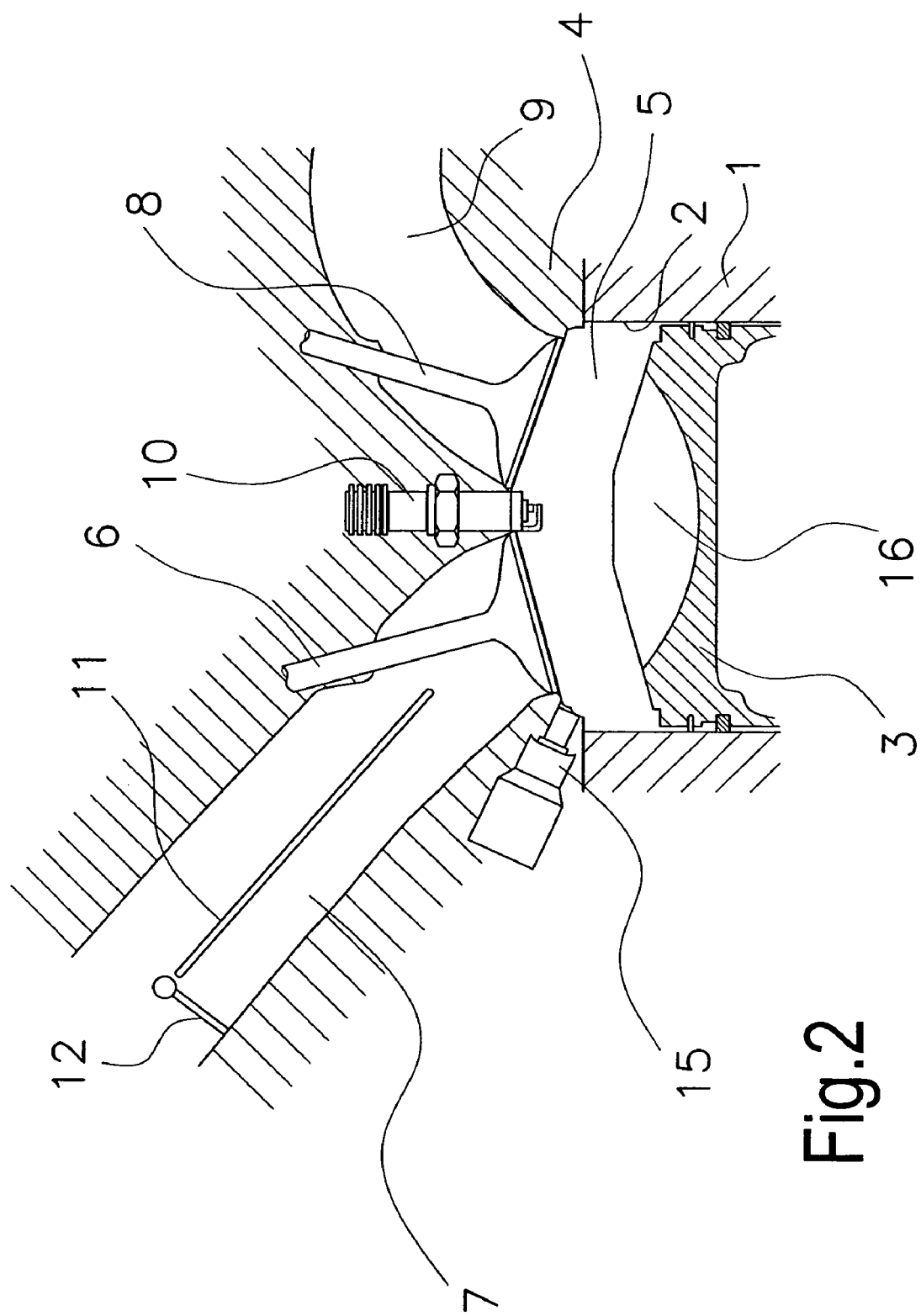
FIG. 2 is a simplified cross sectional view of the internal combustion engine equipped with a direct fuel injection/spark ignition engine control device in accordance with the present invention.
Figure 3:
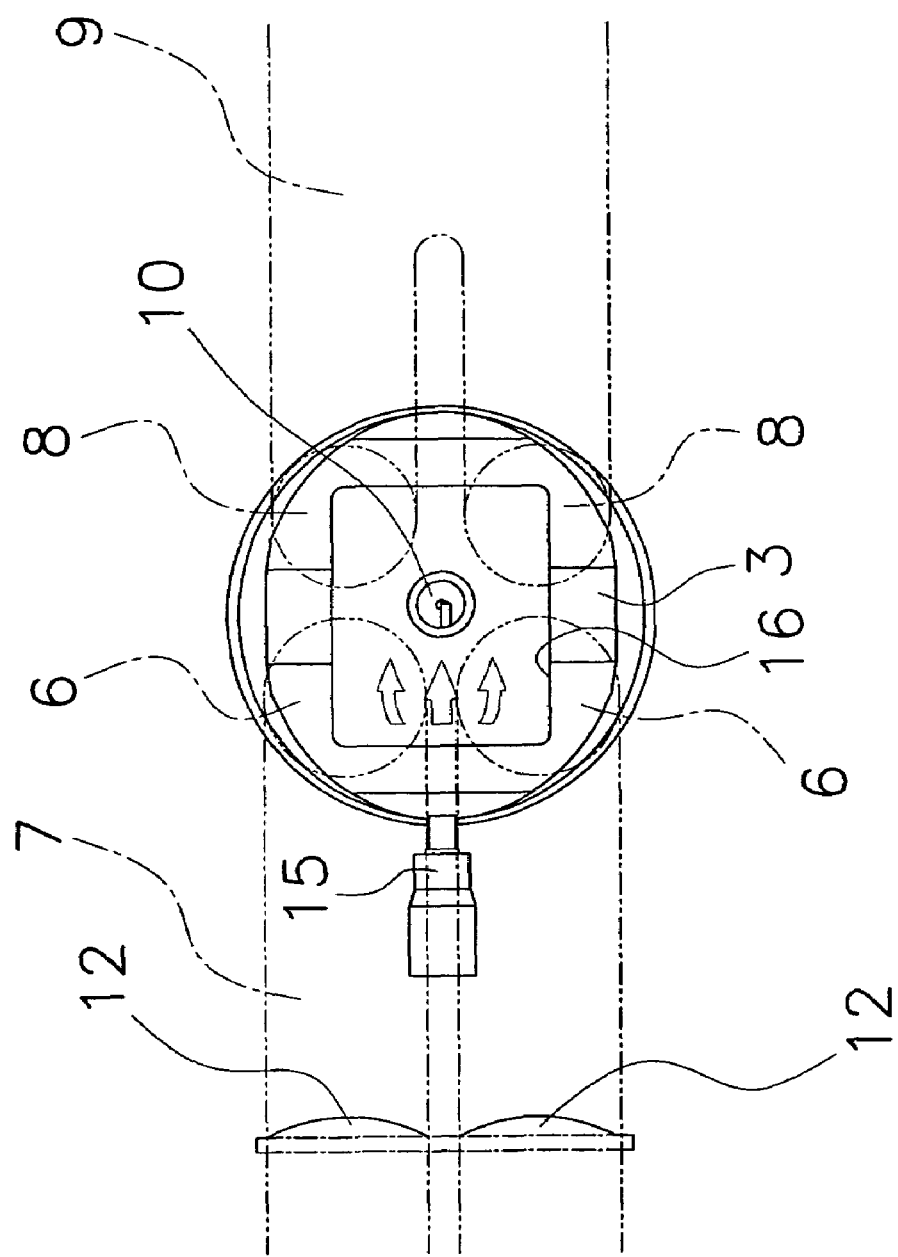
FIG. 3 is a top plan view of the internal combustion engine equipped with a direct fuel injection/spark ignition engine control device in accordance with the present invention.

Referring initially to FIGS. 1 to 3, a direct fuel injection/spark ignition internal combustion engine is diagrammatically illustrated that is equipped with a direct fuel injection/spark ignition engine control device in accordance with a first embodiment of the present invention. The internal combustion engine of this embodiment is, for example, an inline four-cylinder engine. The engine basically includes a cylinder block 1 with a plurality of a cylinders 2, a plurality of pistons 3 slidably disposed in the cylinders 2 and a cylinder head 4 fixed to upper surface of the cylinder block 1. The cylinders 2, the pistons 3 and the cylinder head 4 form a plurality of combustion chambers 5 between the pistons 3 and the cylinder head 4. The cylinder head 4 has a pair of intake valves 6 disposed in a pair of intake ports 7 for each of the combustion chambers 5. The intake ports 7 are opened and closed by the movement of the intake valves 6 in a conventional manner. The cylinder head 4 also has a pair of exhaust valves 8 disposed in a pair of exhaust ports 9 for each of the combustion chambers 5. The exhaust ports 9 are opened and closed by the movement of the exhaust valves 8 in a conventional manner. A spark plug 10 is disposed at the center of the ceiling surface of each of the combustion chambers 5, which is surrounded by these four valves.

As seen in FIG. 2, in this embodiment, a partition wall 11 is provided in inside each of the intake ports 7 for dividing the intake ports 7 into two (upper and lower) flow channels so as to allow a tumble flow to be enhanced depending on the operating condition. Each of the intake ports 7 is also provided with a tumble control valve 12. The tumble control valves 12 are provided for opening and closing the lower flow channel at an upstream end. It is readily apparent to those skilled in the art that the tumble flow is enhanced when the lower flow channel is closed by the tumble control valves 12, and that the tumble flow is weakened when the tumble control valves 12 are open.

Each of the combustion chambers 5 is provided with a fuel injection valve 15 for directly injecting fuel into the cylinder 2. The fuel injection valve 15 is disposed on the lower side of the intake ports 7 of the cylinder head 4. More specifically, the fuel injection valve 15 is disposed in an intermediate position between the pair of intake ports 7. The fuel injection valve 15 is disposed so as to inject fuel along the direction orthogonal to the piston 3 (not shown in the top plan view of FIG. 3). The fuel injection valve 15 is preferably pointed diagonally downward as shown in the cross-sectional diagram of FIG. 2. The downward angle of inclination is relatively small, that is, fuel is injected in a direction that is nearly horizontal.

The apex of the piston 3 has a convex shape along the slope of the ceiling surface of the combustion chamber 5 that has the shape of a pentroof. A concave portion 16 is formed in the center of the piston 3. The concave portion 16 has in a substantially rectangular shape in the top plan view of FIG. 3. The bottom surface of the concave portion 16 is a curved surface that is a circular arcuate surface or approximates a circular arc with a prescribed curvature radius so as to be parallel to the tumble flow.

The exhaust system of the engine of this embodiment has an exhaust passage 21 that is fluidly connected to each of the cylinder exhaust ports 9 of the combustion chambers 5. The exhaust passage 21 includes a catalytic converter 22 with a catalyst for exhaust purification in a conventional manner. Preferably, an oxygen sensor or another air-fuel ratio sensor 23 is disposed in the upstream side of the exhaust passage 21 relative to the catalytic converter 22, as shown in FIG. 1.

The exhaust system of the engine of this embodiment has an intake passage 24 that is fluidly connected to each of the cylinder intake ports 7 of the combustion chambers 5. The intake passage 24 is provided with an electronically controlled throttle valve 25 at its entrance side. The throttle valve 25 is opened and closed by a control signal. The electronically controlled throttle valve 25 is configured and arranged for controlling the intake air quantity to the intake passage 24 of the engine. An exhaust gas recirculation or EGR passage 26 is disposed between the exhaust passage 21 and the intake passage 24, and an exhaust gas recirculation or EGR control valve 27 is interposed therebetween. The cylinder tumble control valves 12 are configured to be opened and closed in unison by a negative pressure tumble control actuator 29 that operates on negative intake pressure introduced via a solenoid valve 28.

Fuel adjusted to a predetermined fuel pressure by a fuel pump 31 and a pressure regulator 32 is fed to the fuel injection valve 15 via a common rail 33. Therefore, the fuel injection valve 15 of each cylinder opens with the application of a control pulse to inject fuel in an amount corresponding to the open valve interval. The spark plug 10 of each cylinder 2 is connected to an ignition coil 34.

The fuel injection timing of the internal combustion engine, the fuel injection amount, the ignition timing, and other parameters are controlled by an engine control unit or ECU 35.

The engine control unit to perform the controlled combustion of the fuel air mixture as discussed below. The engine control unit 35 is a microcomputer comprising of a central processing unit (CPU) and other peripheral devices. The engine control unit 35 can also include other conventional components such as an input interface circuit, an output interface circuit, and storage devices such as a ROM (Read Only Memory) device and a RAM (Random Access Memory) device. The engine control unit 35 preferably includes an engine control program that controls various components as discussed below. The engine control unit 35 receives input signals from various sensors (described below) that serve to detect the operating state of the engine 1 and executes the engine controls based on these signals. It will be apparent to those skilled in the art from this disclosure that the precise structure and algorithms for the engine control unit 35 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The opening of the electronically controlled throttle valve 25 is controlled by a stepping motor or other device operated by the signal from the engine control unit 35. Thus, the electrically controlled throttle valve 25 controls the intake air quantity or amount to the combustion chambers 5 of the engine via the intake passage 2.

Each of the fuel injection valves 6 is configured so as to be opened by a solenoid energized by an injection pulse signal outputted from the engine control unit 35 in synchronization with the engine speed during an intake stroke or a compression stroke. Each of the fuel injection valves 6 injects fuel that is pressurized at a prescribed pressure. Thus, the fuel injected is distributed throughout the combustion chamber 4 such that a homogenous air/fuel mixture is formed in the case of an intake stroke injection, and a stratified air/fuel mixture is formed around the spark plug 5 in the case of a compression stroke injection. The air/fuel mixture is ignited by the spark plug 5 based on an ignition signal from the engine control unit 35, and is burned (homogenous combustion mode, stratified combustion mode or double-injection combustion mode).

The engine control unit 35 receives input signals from the following sensors: the air-fuel sensor 23, an accelerator pedal sensor 30, a crank angle sensor 36, a hot-wire airflow meter (not shown), a throttle sensor (not shown), and an engine coolant temperature sensor 37. The engine control unit 35 executes the engine controls including, but not limited to, the intake air quantity Qa, the ignition timing, the fuel injection quantity and fuel injection timing based on these signals.

The accelerator opening APO is detected by the accelerator pedal sensor 30, which outputs a signal to the engine control unit 35 that is indicative of the depression amount of the accelerator pedal. The engine speed Ne is detected by the crank angle sensor 36, which outputs a signal to the engine control unit 35 that is indicative of the engine speed Ne. The intake air quantity Qa is detected by the airflow meter, which outputs a signal to the engine control unit 35 that is indicative of the intake air quantity Qa. The throttle position TVO is detected by the throttle sensor, which outputs a signal to the engine control unit 35 that is indicative of the throttle position TVO. The engine coolant temperature or water temperature Tw is detected by the engine coolant temperature sensor 37, which outputs a signal to the engine control unit 35 that is indicative of the engine coolant temperature Tw.

The engine control unit 35 is configured to perform a selected combustion mode (homogenous combustion, stratified combustion) based on the engine operating conditions detected by these input signals, and control the opening of the electronically controlled throttle valve 25, the fuel injection timing and fuel injection quantity of the fuel injection valves 15, and the ignition timing of the spark plugs 10 accordingly. Also, under normal operating conditions (after warming-up is completed), extremely lean stratified combustion is performed with an A/F ratio of about 30 to 40 (stratified lean combustion). Homogenous lean combustion (A/F=20 to 30) and homogenous stoichiometric combustion are included in homogenous combustion.

The present invention entails performing optimum combustion control according to load conditions when warming up is required for the catalyst in the catalytic converter 22, which includes cold starting. This type of control is performed by the engine control unit 35 as control from startup through warm-up of the catalyst in accordance with the flowchart in FIG. 4.

Figure 4:
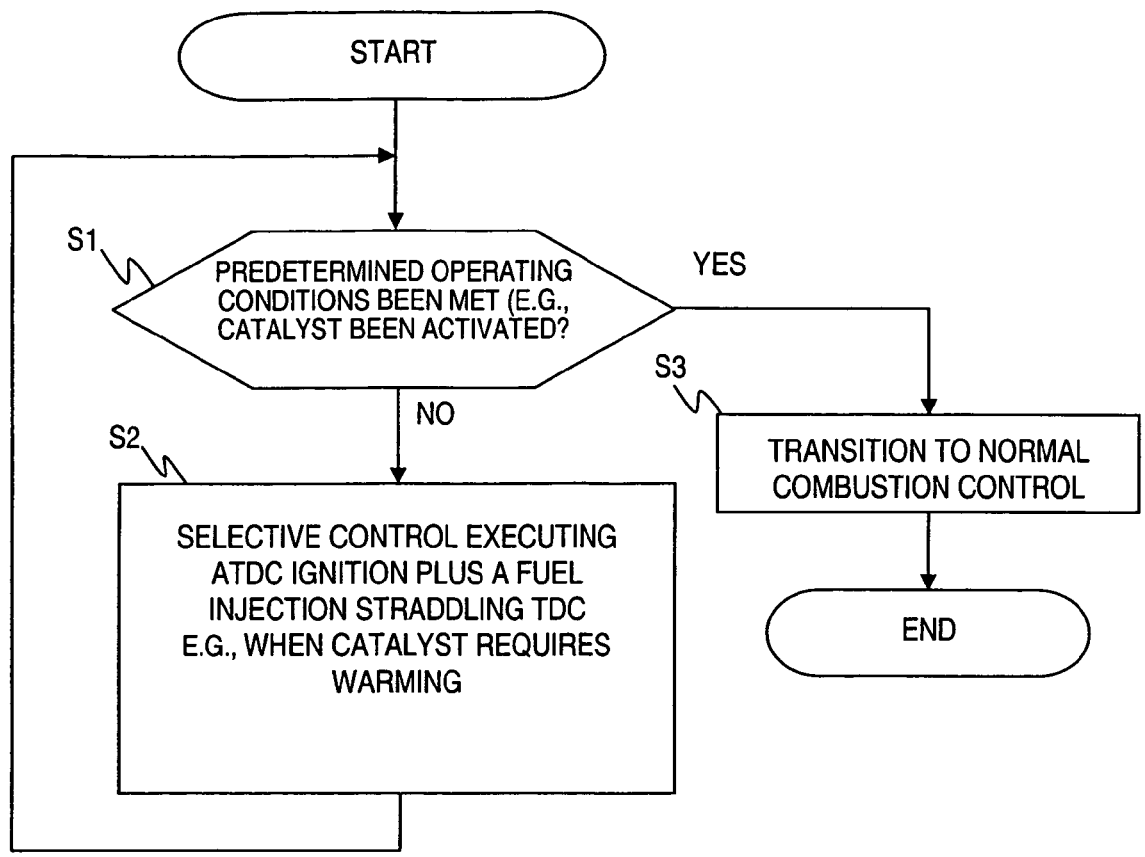
FIG. 4 is a flowchart showing the control operations executed from startup to during warm-up by the control unit of the direct fuel injection/spark ignition engine control device in accordance with the present invention.

The flowchart of in FIG. 4 will now be described, which shows control from startup through warm-up of the catalyst.

In step S1, a determination is made whether the catalyst of the catalytic converter 2 has been activated. Specifically, when a catalyst temperature sensor is provided, the catalyst temperature is detected thereby. When a catalyst temperature sensor is not provided, the catalyst temperature is estimated from the coolant temperature Tw that is detected by the engine coolant temperature sensor 37. The catalyst temperature can alternatively be estimated based on the coolant temperature at startup and the integrated value of the intake amount after startup. In any case, a determination is made whether the detected or estimated catalyst temperature is equal to or greater than the predetermined activation temperature. When the catalyst of the catalytic converter 22 has not been activated, the system advances to step S2.

Figure 5A:
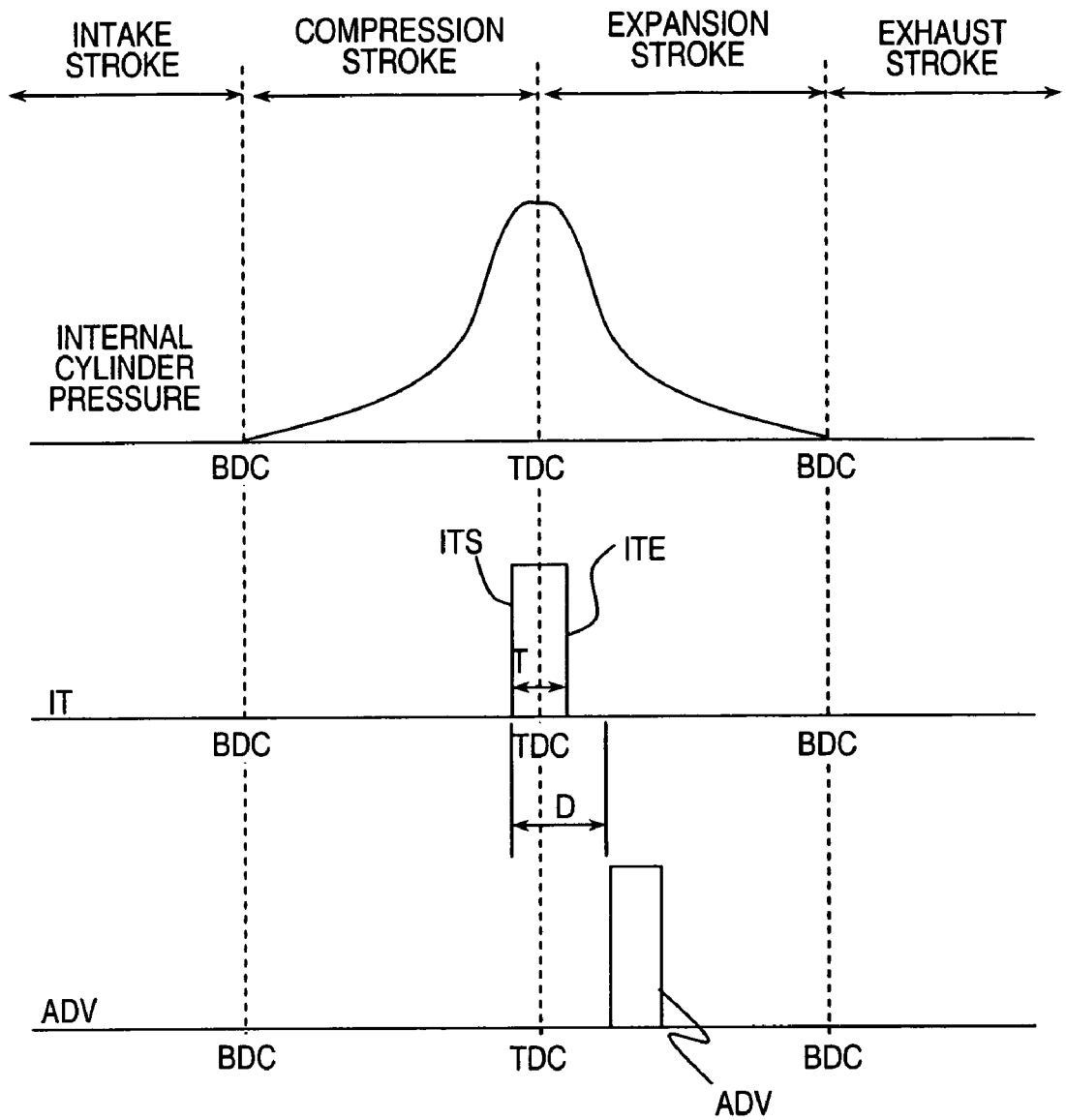
FIG. 5A is a fuel injection timing and ignition timing chart showing the fuel injection timing and the ATDC ignition timing for the fuel injection stroke at compression top dead center in accordance with the present invention.
Figure 5B:
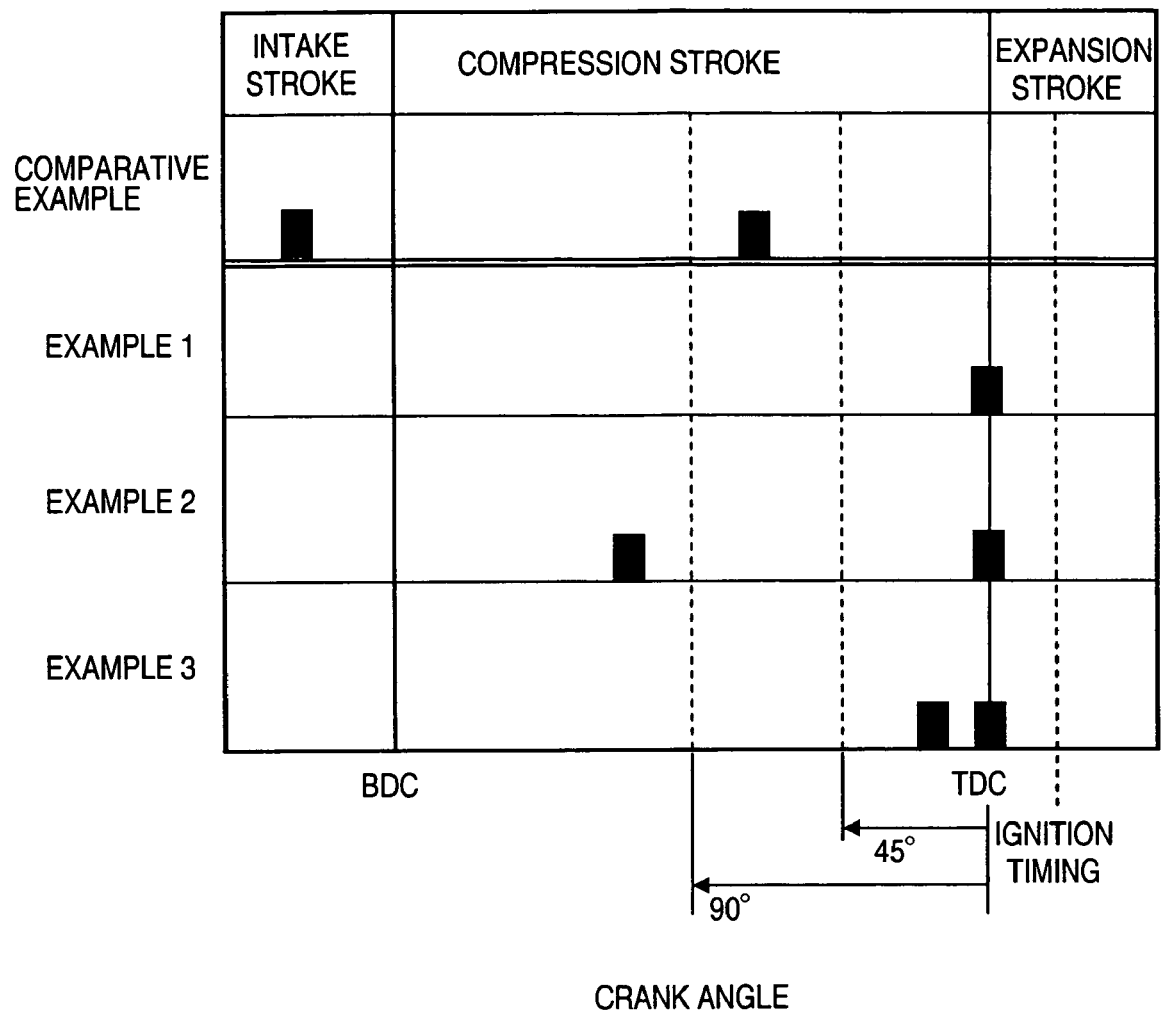
FIG. 5B is a fuel injection timing chart showing various examples of fuel injection timings and the ATDC ignition timing in accordance with the present invention.

In step S2, the ignition timing is delayed until compression top dead center (TDC) or later (ATDC) as the type of control performed when the catalyst requires warming. Specifically, the ignition timing is preferably set to between TDC and 30° ATDC, and more preferably from 15° CA to 30° CA to perform ATDC ignition. As seen in FIG. 5A, a fuel injection timing includes at least a TDC fuel injection with its injection start timing before compression top dead center and its injection end timing after the compression top dead center TDC so that the fuel injection is executed in a period that straddles over the compression top dead center TDC. As seen in FIG. 5B, it should be noted that the fuel injection timing can be either a single injection that straddles over the compression top dead center TDC or spilt into two fuel injections. If two fuel injections are used, then the first fuel injection occurs in the compression stroke injection and the second fuel injection straddles over the compression top dead center TDC. The air-fuel ratio in the combustion chamber produced by to the fuel injection (air-fuel ratio in the combustion chamber produced by the second fuel injection when the fuel injection has been divided into two occurrences) should be stoichiometric or slightly lean (A/F=16 to 17).

The system returns to step S1 after step S2 is complete. When the catalyst of the catalytic converter 22 has been activated by control when the catalyst requires warming, the system advances from step S1 to step S3 and transitions to normal control. In normal control, the above-described stratified lean combustion, homogenous lean combustion, stoichiometric combustion, and other types of combustion are carried out in accordance with the operating conditions.

FIGS. 5A and 5B exemplify various the fuel injection timings used with the ATDC ignition timing of the present invention. In particular, FIG. 5A exemplifies the fuel injection interval at compression top dead center and the ignition timing of the present invention together with the variation in internal cylinder pressure. As seen in FIG. 5B, the fuel injection timing can be either a single injection that preferably straddles over the compression top dead center TDC or spilt into two fuel injections.

As seen in FIG. 5B, the TDC fuel injection has an injection start timing ITS occurs prior to compression top dead center (TDC) and the injection end timing ITE occurs after compression top dead center (TDC) such that the TDC fuel injection straddles over the compression top dead center TDC. The length of the injection interval T for each injection during that time is proportional to the injection amount. The ignition timing ADV occurs after compression top dead center (TDC) and is delayed by a predetermined crank angle (15° CA to 20° CA, for example) from the injection start timing ITS. Since a swirl flow or tumble flow breaks up at the compression top dead center to form a stable area, combustion stability is improved. Ignition timing can thereby be considerably delayed. The delayed interval D ordinarily correlates with the distance from the fuel injection valve 15 to the spark plug 10.

As shown in the Comparative Example of FIG. 5B, when two fuel injections are executed with the first fuel injection being carried out during the intake stroke and the second fuel injection being carried out in the second half of the compression stroke (90 to 45° BTDC, for example), then the turbulence from the first fuel injection in the intake stroke weakens in the second half of the compression stroke. Thus, little effect is made on ATDC ignition even if a second fuel injection is performed in the second half of the compression stroke.

In view of the above, in Example 1 of FIG. 5B, at least one fuel injection occurs at TDC and the ignition timing (ATDC injection) starting at least at or after the last fuel injection start timing to enhance the gas flow at TDC or later and to improve combustion (improved flame propagation) during ATDC ignition by using the turbulence produced by high-pressure fuel injection. Specifically, as shown in Example 1 of FIG. 5A, a single TDC fuel injection timing is used to create turbulence prior to ignition of the fuel in the combustion chamber 5. More specifically, fuel is injected into the combustion chamber 5 with an extremely retarded (expansion stroke) fuel injection occurring at the beginning or during the expansion stroke, i.e., an ATDC injection. The TDC stroke fuel injection has its injection start timing timing ITS occurring in the compression stroke and its injection end timing ITE occurring in the expansion stroke, as shown in Example 1 of FIG. 5B. The ignition timing is preferably set to between 15 and 300 ATDC to perform the expansion stroke or ATDC ignition. Thus, the single TDC stroke fuel injection timing is at least completed before 30° ATDC.

If two fuel injections are used, then the first fuel injection occurs in the compression stroke injection and the second fuel injection straddles over the compression top dead center TDC. The first fuel injection has an injection start timing ITS and an injection end timing ITE executed the compression stroke injection (see Examples 2 and 3 of FIG. 5B).

In Example 2 of FIG. 5B, the first fuel injection is carried out during the first half the compression stroke and the second fuel injection is carried out at TDC with its injection start timing timing ITS occurring in the compression stroke and its injection end timing ITE occurring in the expansion stroke. Again, the ignition timing is preferably set to between 15 and 30° ATDC to perform the expansion stroke or ATDC ignition.

In Example 3 of FIG. 5B, the first fuel injection is carried out during the second half of the compression stroke and the second fuel injection is carried out at TDC with its injection start timing timing ITS occurring in the compression stroke and its injection end timing ITE occurring in the expansion stroke. Again, the ignition timing is preferably set to between 15 and 30° ATDC to perform the expansion stroke or ATDC ignition. In Example 3, the fuel injection control section of the engine control unit 35 is preferably configured to execute the first injection start timing ITS of the first fuel injection in at or after 45° CA before the compression top dead center. The first fuel injection contributes to a stable ATDC ignition when carried out in the compression stroke and when the time until ignition is short (time from the generation of turbulence to the dissipation thereof). In other words, the turbulence generated by the first fuel injection can be improved or enhance by performing the second fuel injection at 45° BTDC or later (preferably 20° BTDC, or later) after the first fuel injection has been performed. This promotes the flame propagation at ATDC ignition.

Figure 6:
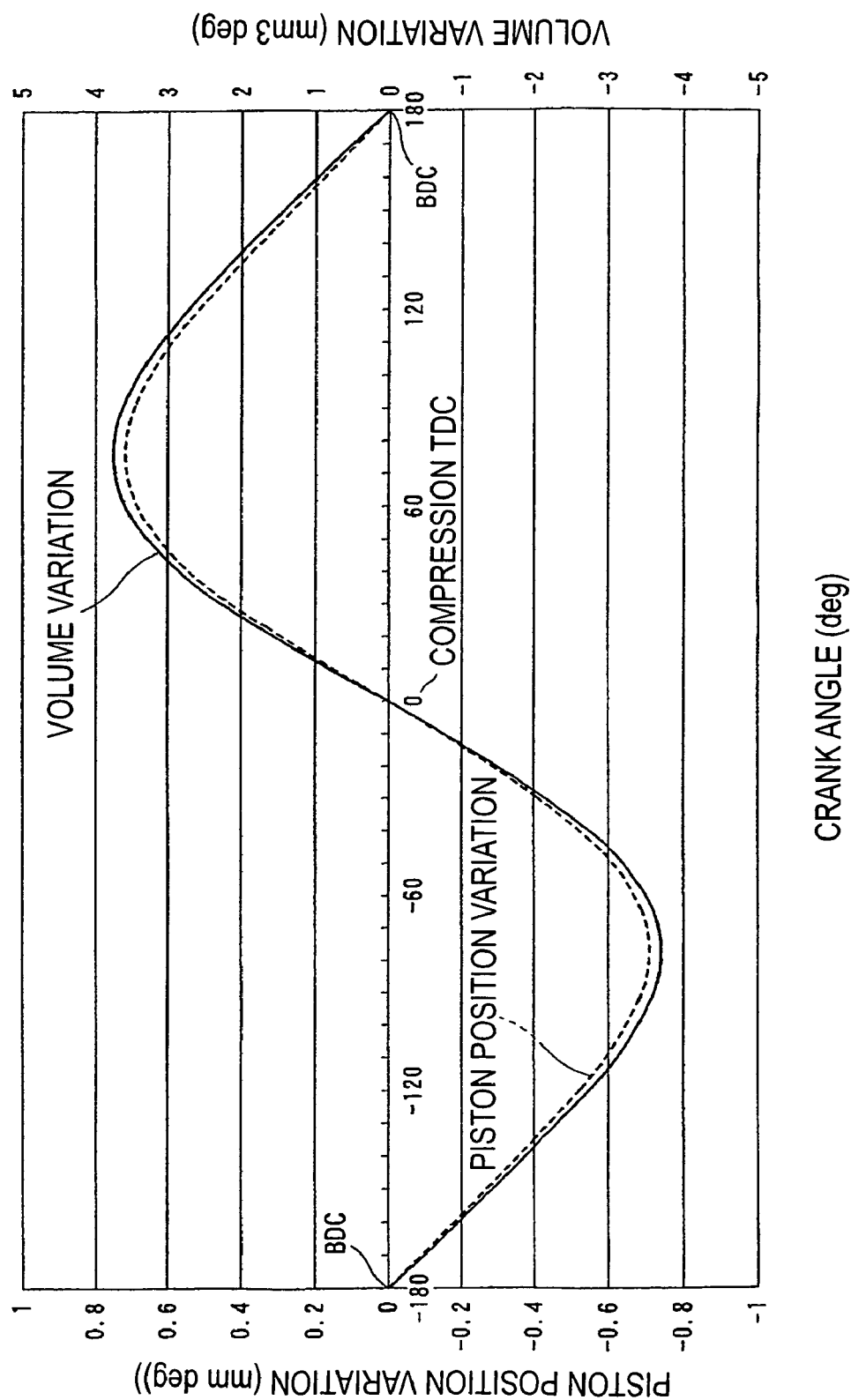
FIG. 6 is a characteristics graph of the piston position variation and volume variation during a single cycle.

FIG. 6 shows the variation in the piston position and the variation in the volume of the combustion chamber 5 due to the piston stroke during a single cycle of an internal combustion engine. The variation per unit of crank angle is greatest in the vicinity of the intermediate position of the stroke, and is very small in the vicinity of the bottom dead center (BDC) and the top dead center (TDC), as shown in the diagram. The variation in the piston position and the variation in the volume are very small in the vicinity of the compression top dead center at which fuel is injected in the present invention. A stable location that is not affected by the movement of the piston 3 or other factors can therefore be formed.

A relatively large swirl flow, tumble flow, or another type of gas flow is generated in the cylinder 2 during the intake stroke, and this flow remains active in the compression stroke. Such a swirl flow, tumble flow, or another type of large flow rapidly breaks up when the piston 3 reaches the compression top dead center and the combustion chamber becomes spatially restricted.

Figure 7:
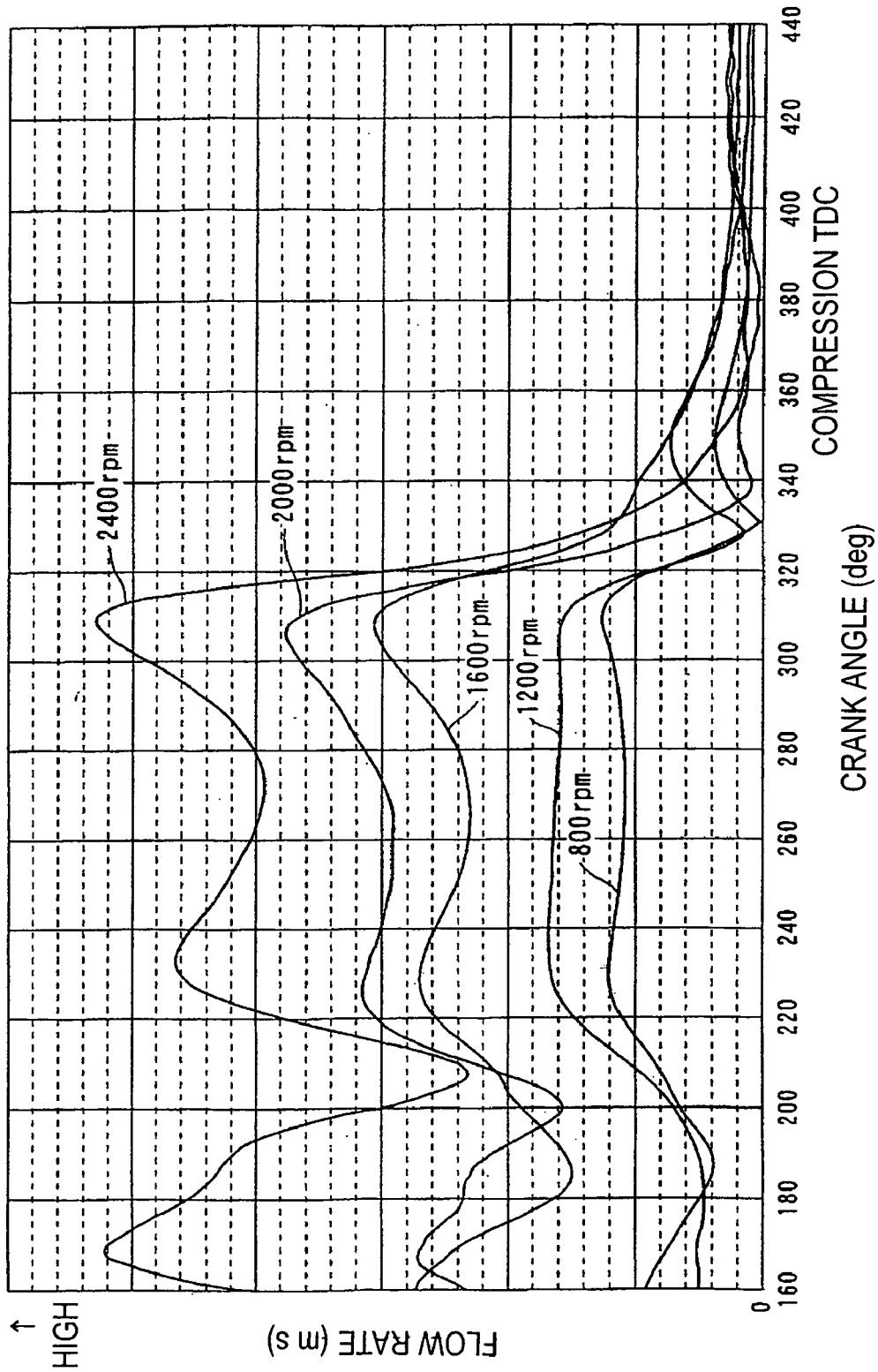
FIG. 7 is a characteristics graph showing the variation of a large flow during a single cycle.

FIG. 7 shows the variation in the flow velocity of a large flow in the combustion chamber under a variety of engine speeds, and a swirl flow or a tumble flow is generated with a strength that corresponds to the rotational speed, as shown in the diagram. The flow rapidly breaks up before the piston reaches top dead center (360° CA). The fuel spray injected near the compression top dead center in the present invention can therefore form a spray with a shape that is always stable with respect to the spark plug without being moved by a large flow such as a swirl flow or a tumble flow.

Figure 8:
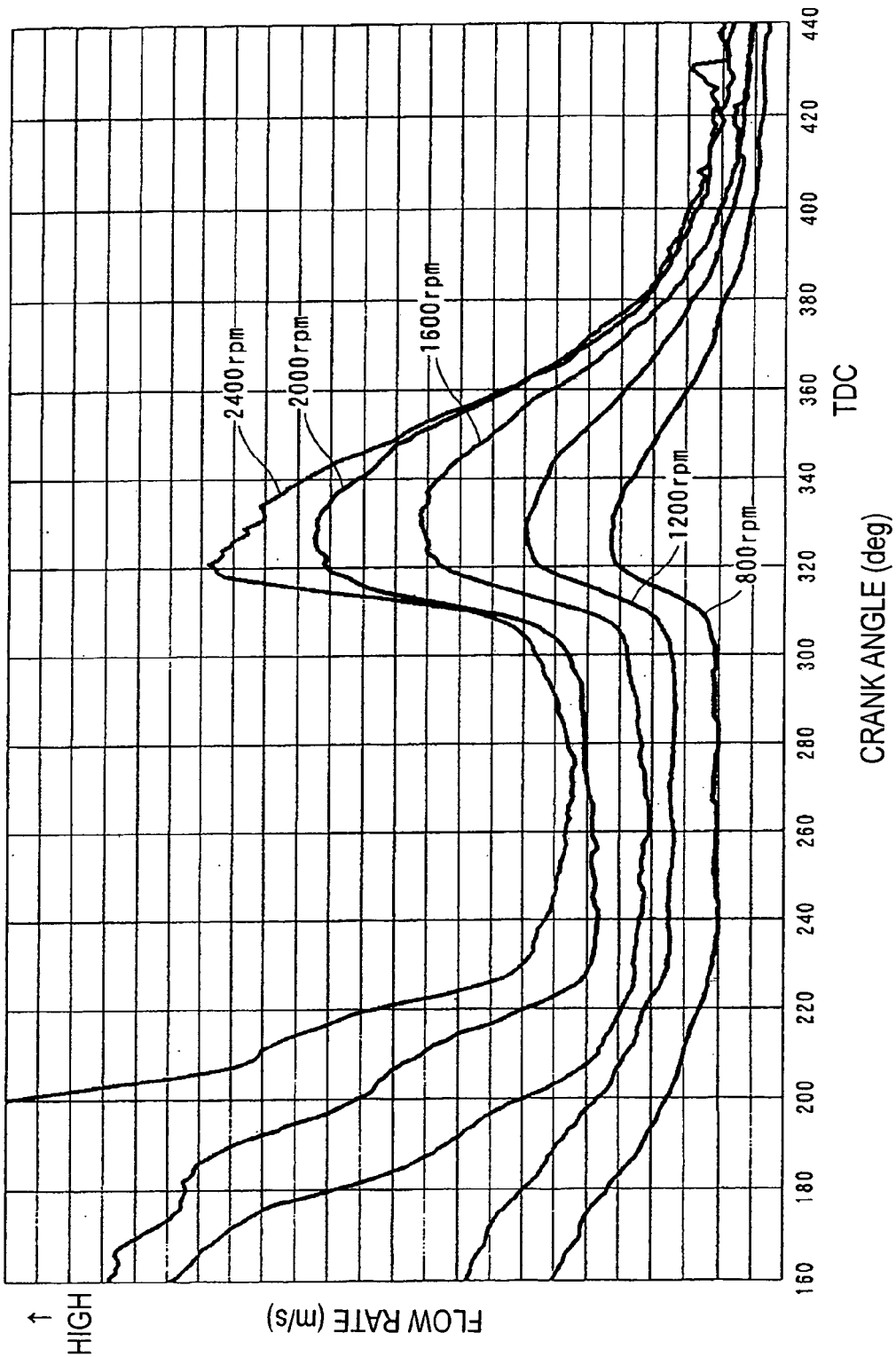
FIG. 8 is a characteristics graph showing the variation of a very small turbulence during a single cycle.

The energy of a relatively large flow such as the above-described swirl flow and tumble flow is transformed into a very small turbulence as the flow breaks up. A very small turbulence in the combustion chamber 5 rapidly increases immediately prior to compression top dead center. FIG. 8 is a diagram of the strength (which has been converted to a flow velocity and is shown as a so-called turbulence flow rate) of a very small turbulence generated in association with the breakup of the flow shown in FIG. 7. The turbulence considerably increases immediately prior to compression top dead center, as shown in the diagram. Such a very small turbulence contributes to activating the combustion area, and an improved combustion effect can be obtained.

That is to say, the area inside the combustion chamber 5 in the vicinity of the compression top dead center to which fuel is injected is devoid of a large flow that is sufficient to move the fuel spray, but does have a considerable number of very small turbulences that activate the combustion, providing a very stable area with respect to the movement of the piston. Stable combustion is therefore possible with ignition timing that is delayed beyond the compression top dead center, and the delay limit of the ignition timing that has limits in terms of combustion stability is further delayed. For this reason, the exhaust gas temperature can be considerably increased and HC discharge can be reduced with considerably delayed ignition timing.

In the internal combustion engine configured in the above-described manner, ordinary stratified combustion operation and homogenous combustion operation are carried out when engine warming has been completed; for example, when the coolant temperature has exceeded 80° C. In other words, fuel is injected with timing suitable for the compression stroke as ordinary stratified combustion operation under conditions in which the tumble control valves 12 are essentially closed in a predetermined range at lower speeds and loads, and ignition is carried out with timing that occurs prior to compression top dead center. It should be noted that in this operation mode fuel injection is always completed prior to compression top dead center. Fuel injected toward the piston 3 in the compression stroke is gathered in the vicinity of the spark plug 10 by using the tumble flow that rotates along the concave portion 16, and is ignited in that location. For this reason, stratified combustion is implemented in which the average air-fuel ratio is lean. Fuel is injected in the compression stroke as ordinary homogeneous combustion operation under conditions in which the tumble control valves 12 are essentially open in a predetermined range at higher speeds and loads, and ignition is carried out at the point of MBT prior to compression top dead center. In this case, the fuel is a homogeneous air-fuel mixture in the cylinder, and operation is essentially performed in the vicinity of the theoretical air-fuel ratio.

In contrast, injection operation at the compression top dead center is selected in order to activate the catalytic converter 22 to reduce HC discharge and to promote temperature increase when the coolant temperature of the internal combustion engine is 80° C. or less. In other words, when the engine has not finished warming, as described above, then the compression top dead center fuel injection operation is selected. In the injection operation of the second injection at the top dead center, the injection start timing ITS occurs prior to compression top dead center (TDC) and the injection end timing ITE occurs after compression top dead center (TDC), whereby fuel injection is carried out so as to straddle the compression top dead center. The ignition timing ADV occurs after the compression top dead center (TDC) and ignition occurs with a timing that is delayed by 15° CA to 20° CA from the injection start timing ITS. Since the fuel spray reaches exactly the vicinity of the spark plug 10 during this delay interval, and a combustible air-fuel mixture is formed in the vicinity of the spark plug 10, the fuel spray reliably reaches firing combustion, and stratified combustion is carried out. The fuel injection amount at this time is controlled so that the average air-fuel ratio is the theoretical air-fuel ratio.

In the present embodiment, the fuel injection timing is controlled so that the injection start timing ITS of the second fuel injection is equal to a predetermined crank angle, and the injection end timing ITE of the second fuel injection is determined by the injection start timing ITS and the fuel injection amount (injection time). It should be noted that it is also possible to adopt a configuration in which the injection start timing ITS of the second fuel injection and the injection end timing ITE of the second fuel injection are calculated based on the fuel injection amount so that the interval prior to the compression top dead center and the interval after the compression top dead center are equal in the fuel injection interval.

In this fashion, combustion stability and considerably delayed ignition timing can be ensured, and a sufficient increase in the temperature of the exhaust gas and a decrease in HC discharge can be achieved by injecting fuel so as to straddle the compression top dead center and delaying the ignition timing beyond the compression top dead center.

Figure 9:
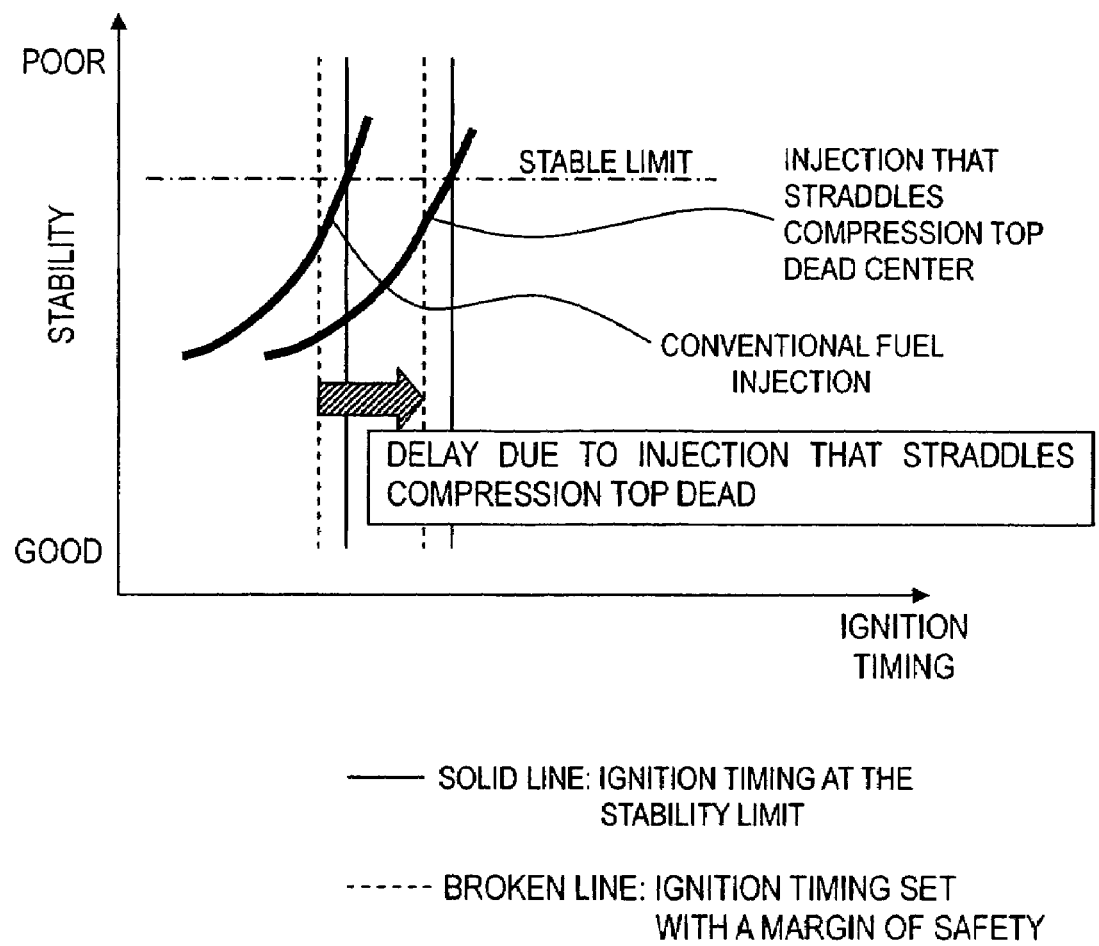
FIG. 9 is a characteristics graph showing a comparison of conventional fuel injection and the ignition timing delay limit of the present embodiment.

FIG. 9 shows a comparison of the delay limit of the ignition timing that is controlled based on combustion stability by using the case of the present embodiment in which fuel is injected so as to straddle the compression top dead center as described above, and also using the case of conventional fuel injection in which fuel injection is completed prior to compression top dead center. In other words, since combustion stability worsens when the ignition timing is delayed as shown by the curves in the diagram, delay of the ignition timing is restricted by the limit of combustion stability, and is limited in practice to the position indicated by the broken line, with some margin being taken into account. In conventional fuel injection, the delay is limited to the position of the broken line a with respect to the same combustion stability limit. In contrast, fuel injection can be delayed to the position indicated by the broken line b in the present embodiment in which fuel is injected so as to straddle the compression top dead center.

Figure 10:
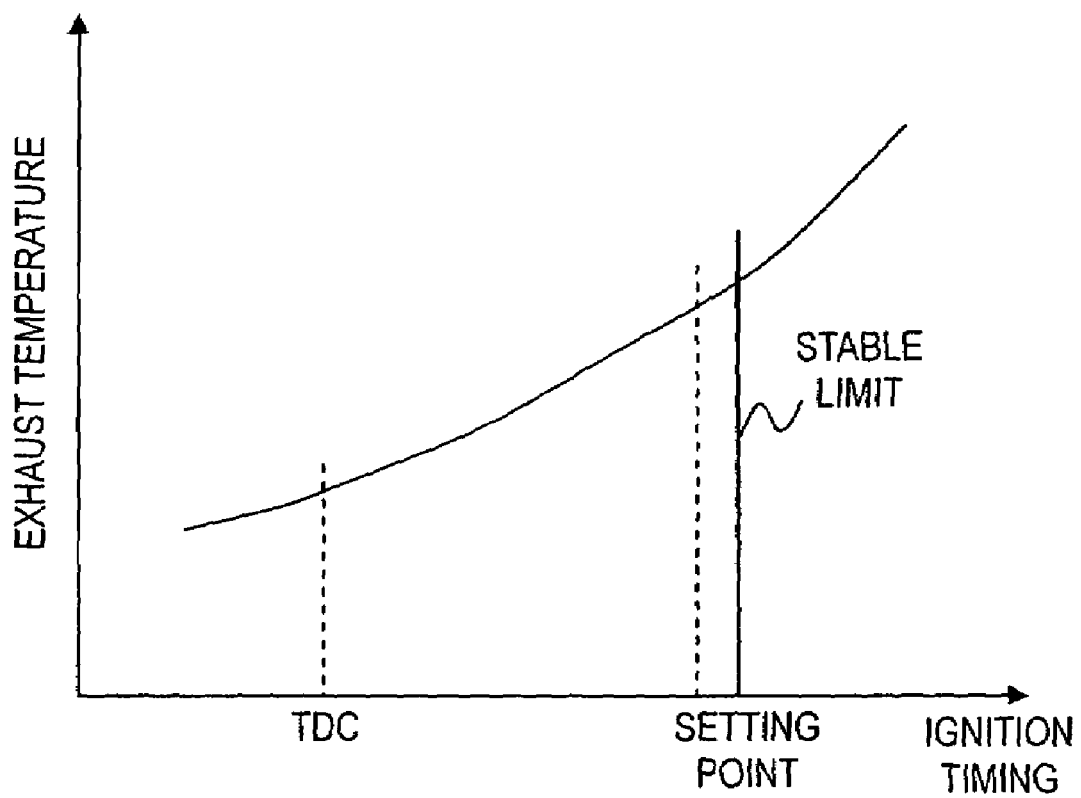
FIG. 10 is a characteristics graph showing the relationship between the ignition timing and the exhaust temperature.

FIG. 10 shows the relationship between the ignition timing ADV and the exhaust temperature, and a greater increase in exhaust temperature is made possible by delaying the ignition timing ADV beyond the compression top dead center. The setting point of the ignition timing ADV in the present embodiment is set to a point that is as close as possible to the combustion stability limit, which is the limit at which combustion stability worsens.

Figure 11:
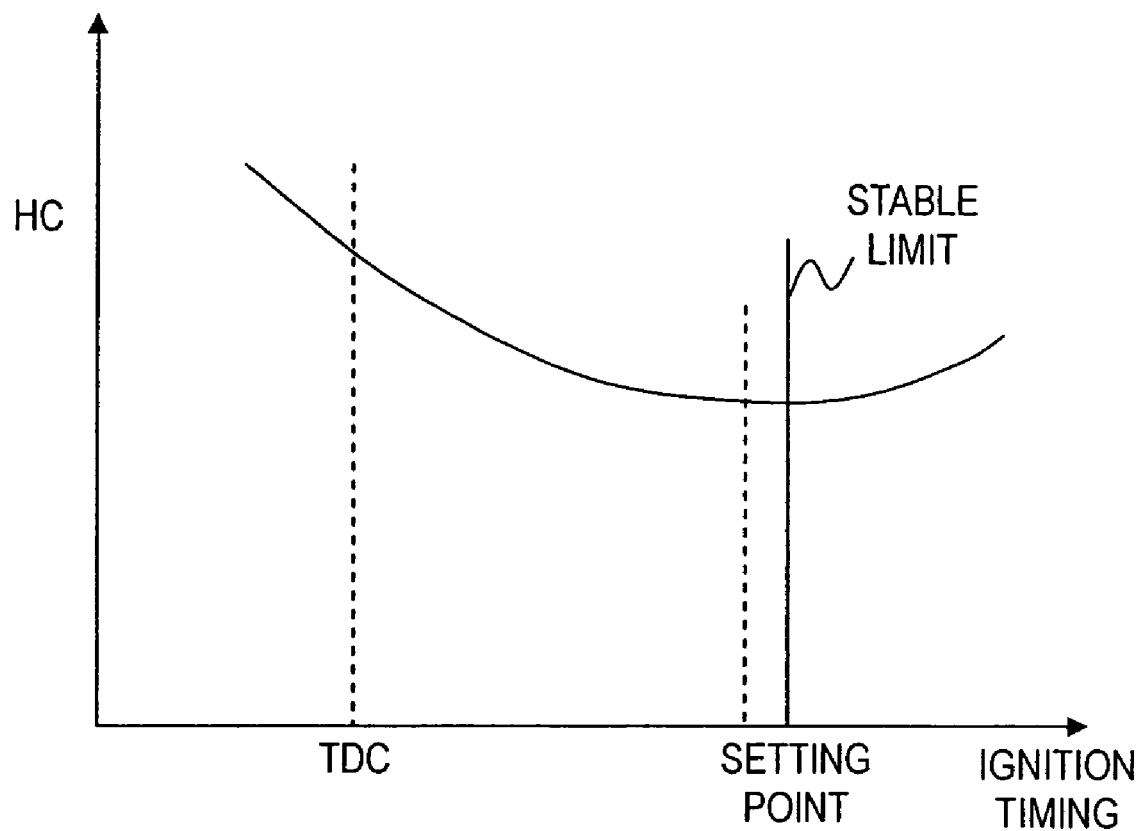
FIG. 11 is a characteristics graph showing the relationship between the ignition timing and HC discharge.

FIG. 11 shows the relationship between the ignition timing and HC discharge, and a greater reduction in HC discharge is made possible by delaying the ignition timing ADV beyond the compression top dead center. In other words, since ignition is carried out in a condition in which the air-fuel mixture is stratified, unburned fuel decreases and HC discharge is reduced. When the ignition timing ADV is set with an excessive delay, the combustion stability naturally declines, and HC tends to worsen because the injected fuel is dispersed, as shown in the diagram.

Figure 12:
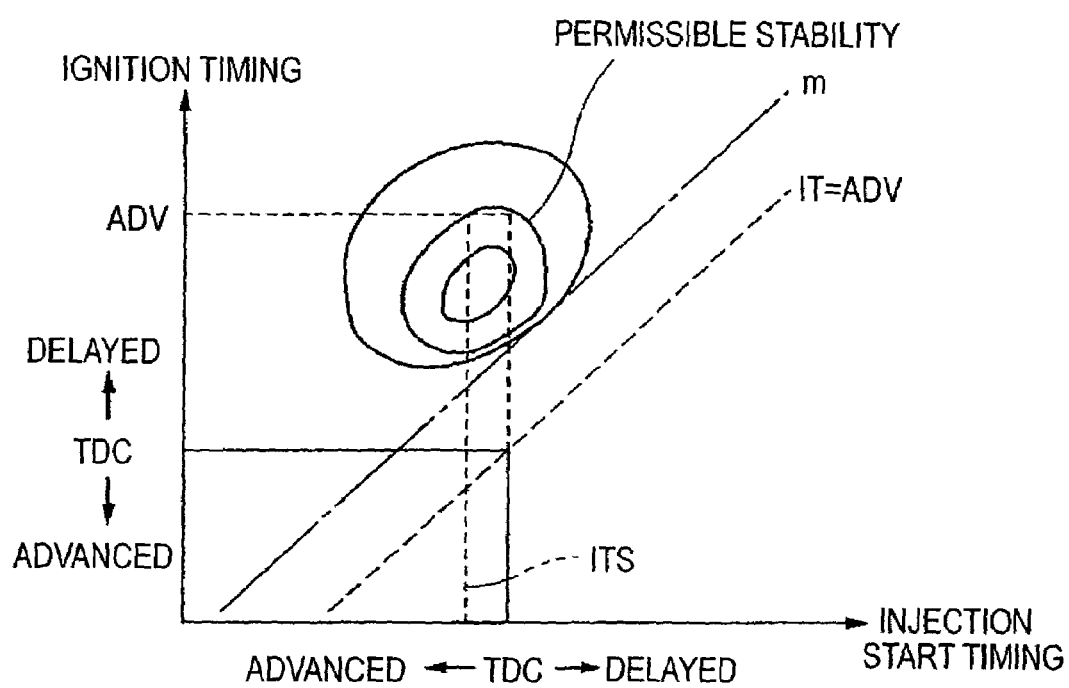
FIG. 12 is a characteristics graph showing the relationship between the fuel injection timing, the ignition timing and the combustion stability.

FIG. 12 shows the relationship between the fuel injection timing IT (fuel injection start timing ITS), the ignition timing ADV, and the combustion stability. The lines indicating equal combustion stability are depicted in the form of contour lines, with the injection start timing ITS and the ignition timing ADV as parameters. The line denoted as "IT=ADV" in the diagram is a line in which the injection start timing ITS and the ignition timing ADV are equal, and the area above this line indicates that the ignition timing ADV is relatively slower. The alternate long and short dash line m indicates the time difference until the fuel spray reaches the spark plug 10. The combustion stability is highest when the fuel injection start timing ITS is in the vicinity of the top dead center, and the ignition timing ADV is somewhat delayed thereafter, as shown in the diagram. The area inside the lines of equal combustion stability, which are bounded by combustion stability limits as permissible levels of combustion stability, is the range in which combustion can take place. In the present embodiment, the ignition timing ADV is set so as to achieve the greatest delay in this range, and the fuel injection start timing ITS is set in correspondence with the ignition timing ADV.

ALTERNATE EMBODIMENTS

Figure 13:
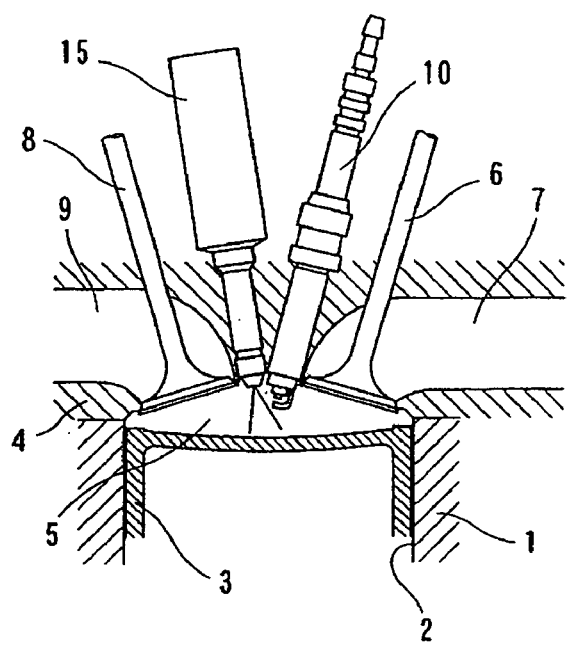
FIG. 13 is a simplified cross sectional view of an internal combustion engine equipped with a direct fuel injection/spark ignition engine control device in accordance with another embodiment of the present invention.
Figure 14:
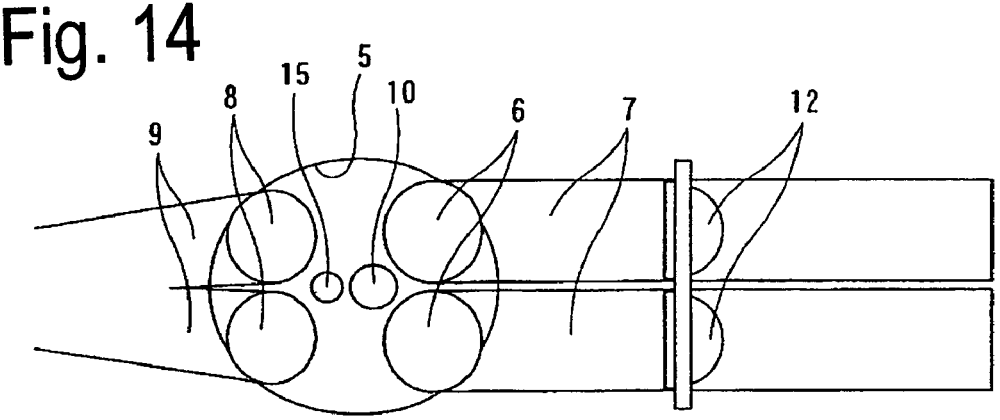
FIG. 14 is a top plan view of the internal combustion engine illustrated in FIG. 13.
Figure 15:
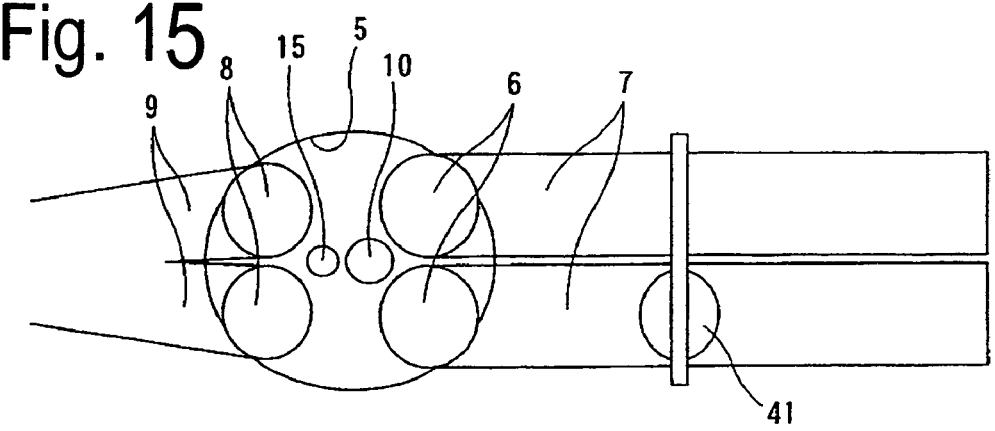
FIG. 15 is a top plan view of the internal combustion engine illustrated in FIG. 14 in which a swirl control valve has been provided in place of the tumble control valves.

Referring now to FIGS. 13–15, an internal combustion engine in accordance with alternate embodiments will now be explained. In view of the similarity between the first embodiment and the alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

These alternate embodiments are ones in which the position of the fuel injection valves 15 have been changed. In a so-called fuel injection type, the fuel injection valves 15 are disposed in the center of the ceiling of the combustion chamber 5 surrounded by the pair of intake valves 6 and the pair of exhaust valves 8. The spark plugs 10 are disposed adjacent to the fuel injection valves 15. The fuel injection valve 15 is configured to inject fuel at an angle that is close to vertical, and is more specifically slightly tilted toward the spark plug 10; and a portion of the spray moves toward the vicinity of the electrode portion of the spark plug 10. It should be noted that the apex of the piston 3 has an overall moderate convex surface. Also, the tumble control valves 12 are disposed in the intake ports 7 for enhancing the tumble flow as seen in FIG. 13. Alternately, a known swirl control valve 41 is provided in the intake ports 7 for opening and closing only one of the intake ports 7 instead of the tumble control valves 12, as shown in FIG. 14. Thus, a swirl flow is generated by closing the swirl control valve 41.

The above-described top dead center operation is also possible in an internal combustion engine with such configurations.

In the above embodiments, examples were described in which tumble control valves or a swirl control valve is provided in order to enhance the tumble flow or the swirl flow as required, but the present invention can be similarly applied to an internal combustion engine that is not equipped with a device for enhancing such a gas flow.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A direct fuel injection/spark ignition engine control device comprising:

a fuel injection control section configured to control fuel injections of a fuel injection valve that directly injects fuel into a combustion chamber, the fuel injection control section being further configured to set a fuel injection timing including a fuel injection with an injection start timing before compression top dead center and an injection end timing after the compression top dead center so that the fuel injection is injected during a period that straddles over the compression top dead center; and an ignition timing control section configured to control sparking of a spark plug disposed in the combustion chamber such that an ignition timing is set to ignite fuel at or after the compression top dead center.

2. The direct fuel injection/spark ignition engine control device according to claim 1, wherein the ignition timing control section is further configured to set the ignition timing between 15° CA and 20° CA after the fuel injection start timing.

3. The direct fuel injection/spark ignition engine control device according to claim 1, wherein the fuel injection control section is further configured to set a fuel injection interval before the compression top dead center and a fuel injection interval after the compression top dead center that are substantially equal.

4. The direct fuel injection/spark ignition engine control device according to claim 1, wherein the fuel injection control section is further configured to set an additional injection start timing of an additional fuel injection so that a part of the additional fuel injection in the additional fuel injection is injected in a compression stroke.

5. The direct fuel injection/spark ignition engine control device according to claim 4, wherein the fuel injection control section is further configured to set the additional injection start timing of the additional fuel injection in a second half of the compression stroke.

6. The direct fuel injection/spark ignition engine control device according to claim 5, wherein the fuel injection control section is further configured to set the additional injection start timing of the additional fuel injection at or after 45° CA before the compression top dead center.

7. The direct fuel injection/spark ignition engine control device according to claim 1, wherein the fuel injection control section is further configured to set the fuel injection timing upon receiving a command to increase exhaust gas temperature.

8. The direct fuel injection/spark ignition engine control device according to claim 1, wherein the fuel injection control section is further configured to set the fuel injection timing such that an average air-fuel ratio inside the combustion chamber is in an air-fuel ratio range between around stoichiometric and slightly lean during ignition.

9. The direct fuel injection/spark ignition engine control device according to claim 2, wherein the fuel injection control section is further configured to set a fuel injection interval before the compression top dead center and a fuel injection interval after the compression top dead center that are substantially equal.

10. The direct fuel injection/spark ignition engine control device according to claim 2, wherein the fuel injection control section is further configured to set an additional injection start timing of an additional fuel injection so that a part of the additional fuel injection in the additional fuel injection is injected in a compression stroke.

11. The direct fuel injection/spark ignition engine control device according to claim 10, wherein the fuel injection control section is further configured to set the additional injection start timing of the additional fuel injection in a second half of the compression stroke.

12. The direct fuel injection/spark ignition engine control device according to claim 11, wherein
the fuel injection control section is further configured to set the additional injection start timing of the additional fuel injection at or after 45° CA before the compression top dead center.

13. The direct fuel injection/spark ignition engine control device according to claim 11, wherein
the fuel injection control section is further configured to set the fuel injection timing upon receiving a command to increase exhaust gas temperature.

14. The direct fuel injection/spark ignition engine control device according to claim 11, wherein
the fuel injection control section is further configured to set the fuel injection timing such that an average air-fuel ratio inside the combustion chamber is in an air-fuel ratio range between around stoichiometric and slightly lean during ignition.

15. The direct fuel injection/spark ignition engine control device according to claim 3, wherein
the fuel injection control section is further configured to set the fuel injection timing upon receiving a command to increase exhaust gas temperature.

16. The direct fuel injection/spark ignition engine control device according to claim 3, wherein
the fuel injection control section is further configured to set the fuel injection timing such that an average air-fuel ratio inside the combustion chamber is in an air-fuel ratio range between around stoichiometric and slightly lean during ignition.

17. A direct fuel injection/spark ignition engine control device comprising:
fuel injection controlling means for controlling fuel injections of a fuel injection valve that directly injects fuel into a combustion chamber, the fuel injection control controlling being further configured to set a fuel injection timing including a fuel injection with an injection start timing before compression top dead center and an injection end timing after the compression top dead center so that the fuel injection is injected during a period that straddles over the compression top dead center; and
ignition timing controlling means for controlling ignition of a spark plug disposed in the combustion chamber such that an ignition timing is set to ignite fuel at or after a compression top dead center.

18. A method of controlling a direct fuel injection/spark ignition engine comprising:
controlling fuel injections of a fuel injection valve that directly injects fuel into a combustion chamber;
setting a fuel injection timing including a fuel injection with an injection start timing before compression top dead center and an injection end timing after the compression top dead center so that the fuel injection is injected during a period that straddles over the compression top dead center; and
controlling ignition of a spark plug disposed in the combustion chamber such that an ignition timing is set to ignite fuel at or after a compression top dead center.

* * * * *